US008760236B2

(12) United States Patent
Maker et al.

(10) Patent No.: US 8,760,236 B2
(45) Date of Patent: Jun. 24, 2014

(54) DRIFT STABILIZATION OF MAGNETICALLY TUNABLE FILTER BY TEMPERATURE REGULATION AND MECHANICAL ISOLATION OF ELCTROMAGNET COIL

(75) Inventors: Charles Maker, Occidental, CA (US); Darrin D. Rath, Santa Rosa, CA (US); Paul E. Cassanego, Santa Rosa, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 318 days.

(21) Appl. No.: 13/193,024

(22) Filed: Jul. 28, 2011

(65) Prior Publication Data

US 2013/0027152 A1 Jan. 31, 2013

(51) Int. Cl.
*H04B 3/04* (2006.01)
*H01P 1/20* (2006.01)

(52) U.S. Cl.
USPC ........................ 333/17.1; 333/202; 333/219.1

(58) Field of Classification Search
USPC ............... 333/219.2, 17.1, 202–204; 335/217
See application file for complete search history.

(56) References Cited

U.S. PATENT DOCUMENTS

| | | | | |
|---|---|---|---|---|
| 3,973,204 | A * | 8/1976 | Keiter | 455/197.1 |
| 4,465,974 | A * | 8/1984 | Sparks | 324/205 |
| 4,506,240 | A * | 3/1985 | Shores et al. | 333/202 |
| 4,555,683 | A * | 11/1985 | Sorger et al. | 333/202 |
| 4,827,230 | A * | 5/1989 | Harris | 333/202 |
| 5,221,912 | A * | 6/1993 | Keane et al. | 333/202 |
| 5,291,163 | A * | 3/1994 | Finkle et al. | 333/219.2 |
| 5,298,872 | A | 3/1994 | Trump et al. | |
| 5,517,161 | A * | 5/1996 | Andersson et al. | 333/202 |
| 5,959,513 | A * | 9/1999 | Parrott et al. | 333/219.2 |
| 6,727,775 | B2 * | 4/2004 | Basawapatna et al. | 333/17.1 |
| 7,378,926 | B2 * | 5/2008 | Abe et al. | 333/219.2 |

FOREIGN PATENT DOCUMENTS

| | | | |
|---|---|---|---|
| FR | 2573923 | | 5/1986 |
| GB | 2161653 | A * | 1/1986 |

* cited by examiner

*Primary Examiner* — Robert Pascal
*Assistant Examiner* — Kimberly Glenn

(57) ABSTRACT

An electromagnet structure comprises a magnetic shell having a cavity, a magnetic pole located within the cavity and having a magnetic gap for focusing a magnetic field on a magnetically tunable filter, a conductive coil located within the cavity of the magnetic shell and forming multiple turns around the magnetic pole, and a heater located within the cavity of the magnetic shell and configured to maintain the conductive coil at a substantially constant temperature when the magnetically tunable filter is tuned to different frequencies.

20 Claims, 9 Drawing Sheets

300

300

300

300

500

600

DRIFT STABILIZATION OF MAGNETICALLY TUNABLE FILTER BY TEMPERATURE REGULATION AND MECHANICAL ISOLATION OF ELCTROMAGNET COIL

BACKGROUND

Yttrium iron garnet (YIG) filters are magnetically tunable bandpass filters that can be found in a variety of test and measurement systems. For example, YIG filters are commonly included in front-end sections of microwave spectrum analyzers as a preselector for applied input signals.

YIG belongs to a broader class of microwave band ferrimagnetic materials used to make microwave filters and oscillators. These materials, as applied to such applications, are referred to generally as "ferrimagnetic resonators". Other types of garnets include YIG doped with aluminum, gallium, gadolinium, or aluminum and gadolinium, and calcium vanadium. In addition to garnets, magnetic ferrites can be used, such as magnesium, magnesium-zinc, magnesium-aluminum, nickel, nickel-aluminum, nickel-zinc, lithium, and hexagonal ferrites made with barium, for example.

FIG. 1 shows an example YIG filter 100 that can be found in a microwave spectrum analyzer or other electronic system. Although not shown in FIG. 1, YIG filter 100 is generally used in conjunction with a magnetic source such as an electromagnet. The magnetic source generates a magnetic field "H" that can be adjusted to tune YIG filter 100 to a desired frequency passband.

Referring to FIG. 1, YIG filter 100 comprises a YIG sphere 105, an input coil 110, and an output coil 115. During operation, input coil 110 receives an input signal in the microwave frequency range. The input signal produces a fluctuating magnetic field on YIG sphere 105, which causes it to resonate. The resonance of YIG sphere 105 induces an electrical current in output coil 115 to produce an output signal that is a filtered version of the input signal.

The output signal of YIG filter 100 has a frequency spectrum determined by the frequency passband of YIG sphere 105. The center frequency of the passband can be raised or lowered by increasing or decreasing the strength of magnetic field "H", and the width of the passband can be increased or decreased by adjusting other factors such as the geometry and configuration of input and output coils 110 and 115. The passband can also be modified by varying the number of YIG spheres in the filter. For instance, many applications use three or four YIG spheres, although any number of spheres is possible. In addition, as alternatives to YIG spheres, other types of ferrite materials can be used for the filter element, such as barium hexi-ferrite, nickel zinc, or various other materials.

In some applications, YIG filter 100 is placed in a gap along a magnetic pole of an electromagnet to allow precise focusing of magnetic field "H". In such applications, the passband and the center frequency of YIG filter 100 varies according to the magnetic flux density "B" within the magnetic gap. The magnetic flux density "B" can be modified by changing the strength of magnetic field "H" or by changing the size of the magnetic gap.

FIG. 2 shows an example front-end 200 of a microwave spectrum analyzer using a YIG filter such as that illustrated in FIG. 1. In this example, front-end 200 has a frequency range of 0-50 GHz. However, other front-end designs can be used for other frequency ranges.

Referring to FIG. 2, front-end 200 comprises an input band switch 205, low pass filter 210, preselector 220, and frequency mixers 215 and 225. Preselector 220 comprises a YIG filter that restricts the frequency spectrum of signals provided to the corresponding mixer 225.

During operation, input band switch 205 receives an input signal and transmits it to a designated one of the filters 210 or 220 according to an operating mode of the spectrum analyzer. The input signal is filtered by the designated filter and then transmitted to a corresponding one of frequency mixers 215 and 225. The respective passbands of preselectors 210 and 220 are typically designed to match to the respective mixing modes of frequency mixers 215 and 225.

YIG filters can generally provide high frequency selectivity and broad frequency tuning ranges. However, they can also suffer from frequency drift, making it difficult to accurately set and maintain a passband center frequency at a desired value. Where the passband center frequency of a YIG filter is inaccurately set or maintained in a preselector of a microwave spectrum analyzer, amplitude errors can occur in the spectrum analyzer's response.

One cause of frequency drift is heat dissipated by an electromagnet used to tune the YIG filter. The electromagnet dissipates heat through conductive coils that generate the magnetic field for tuning. The dissipated heat causes non-uniform thermal expansion of the electromagnet, which can gradually modify the passband center frequency by changing the magnetic field density "B" applied to the YIG filter. This frequency drift tends to stabilize as the thermal expansion approaches an equilibrium state. However, a typical electromagnet structure can take several minutes to reach equilibrium.

Another cause of frequency drift is thermal expansion due to changes in ambient temperature. This type of thermal expansion can be less predictable than that caused by the electromagnet, and the ambient temperature may not have a reliable equilibrium state.

Frequency drift can be especially problematic in YIG filters designed for high frequency ranges, such as 50 GHz, because these YIG filters are generally placed in a smaller magnetic gap in order to increase magnetic flux density. The small size of the magnetic gap can magnify the effects of thermal expansion in the electromagnet, which can lead to unacceptable levels of frequency drift.

What is needed, therefore, are improved techniques and technologies for stabilizing drift in YIG filters. Such improvements are especially needed for high frequency applications such as microwave spectrum analyzers.

SUMMARY

In accordance with a representative embodiment, an electromagnet structure, comprises: a magnetic shell comprising a cavity; a magnetic pole located within the cavity and having a magnetic gap for focusing a magnetic field on a magnetically tunable filter; a conductive coil located within the cavity of the magnetic shell and forming multiple turns around the magnetic pole; and a heater located within the cavity of the magnetic shell and configured to maintain the conductive coil at a substantially constant temperature when the magnetically tunable filter is tuned to different frequencies.

In accordance with another representative embodiment, a method of controlling an electromagnet structure comprising an electronic filter is disclosed. The method comprises: energizing an electromagnet coil to tune the filter to a target frequency range; determining a set point of a parameter to maintain the filter in the target frequency range; receiving feedback indicating a state of the parameter; and adjusting a power level of an input signal supplied to the electromagnet structure to maintain the parameter at the set point.

BRIEF DESCRIPTION OF THE DRAWINGS

The described embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION OF EMBODIMENTS

Figure 1:
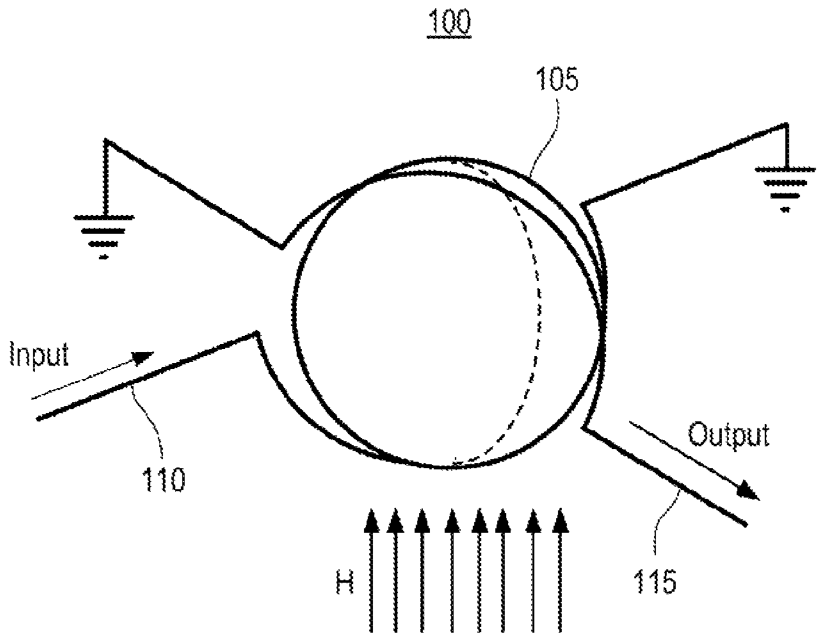
(Prior Art) Fig. 1
FIG. 1 is a perspective diagram of a YIG filter that can be incorporated in an electromagnet structure.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings. In addition, unless expressly so defined herein, terms are not to be interpreted in an overly idealized fashion. For example, the terms "isolation" or "separation" are not to be interpreted to require a complete lack of interaction between the described features.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to within acceptable limits or degree.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

The described embodiments relate generally to frequency drift stabilization in magnetically tunable filters. In some embodiments, frequency drift is stabilized by incorporating a heater into a conductive coil used to magnetize a magnetically tunable filter. The heater can be adjusted to maintain the conductive coil at a substantially constant temperature. This reduces frequency drift due to thermal expansion, as will be described below.

In other embodiments, frequency drift is stabilized by mechanically isolating the conductive coil from a shell encompassing the YIG filter. The mechanical isolation can be accomplished, for instance, by placing the conductive coil on a pedestal that is mechanically separated from the shell. The pedestal can be connected to a heat sink to dissipate thermal energy from the coil. The mechanical isolation of the coil can prevent it from placing stress on the shell when it undergoes thermal expansion, as will be described below.

Figure 2:
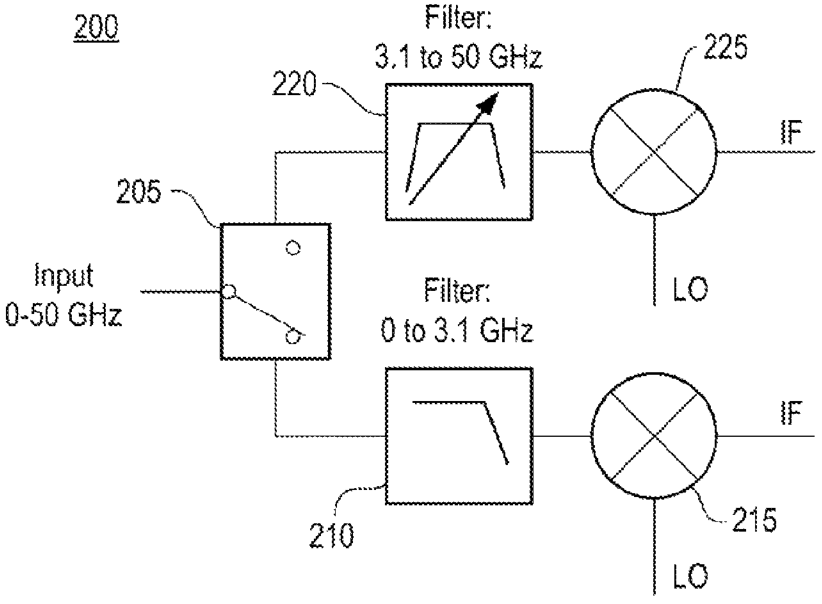
(Prior Art) Fig. 2
FIG. 2 is a block diagram of a front-end of a microwave spectrum analyzer that can incorporate a YIG filter and electromagnet structure.

Certain embodiments can be implemented using a YIG filter such as that illustrated in FIG. 1. However, these embodiments are not limited to YIG filters, and they could be modified to use other types of magnetically tunable filters, such as other types of ferrite filters. Moreover, certain embodiments can be incorporated in a preselector such as that illustrated in FIG. 2. However, these embodiments are not limited to the illustrated preselector, and they could be incorporated in various alternative filtering applications, including other types of preselectors.

One way to evaluate the performance of the described embodiments is by measuring post-tuning frequency drift of a tuned filter. Post-tuning frequency drift is the amount of change in the filter's center frequency after it is tuned to a new passband. As an example, suppose a filter is changed from a center frequency of 3 GHz to a center frequency of 50 GHz. At the 50 GHz center frequency, an electromagnet must supply a much larger current to a conductive coil compared to the 3 GHz frequency. Consequently, the conductive coil tends to heat up after the filter is tuned to 50 GHz. This heat creates thermal expansion in the electromagnet, which can cause the filter's center frequency to drift. However, by using a heater and/or coil isolation pedestal to mitigate the effects of the heat, the amount of post-tuning frequency drift can be reduced to less than 10 MHz of a 45 MHz passband.

Figure 3A:
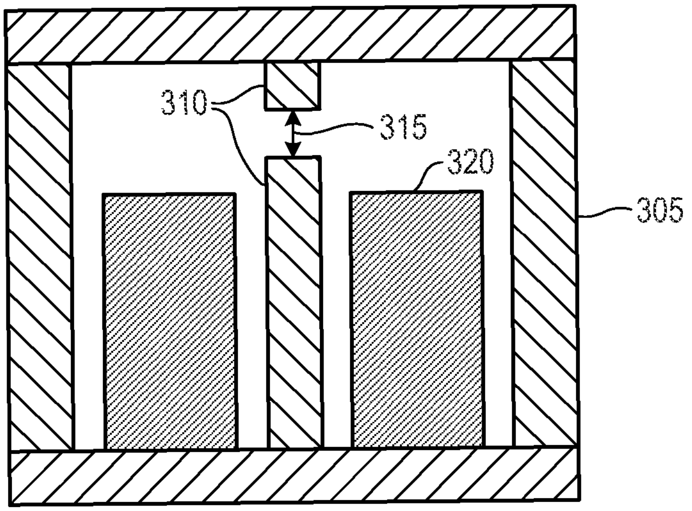
FIGS. 3A through 3C are cross-sectional diagrams of an electromagnet structure configured to incorporate a YIG filter in accordance with a representative embodiment.
Figure 3B:
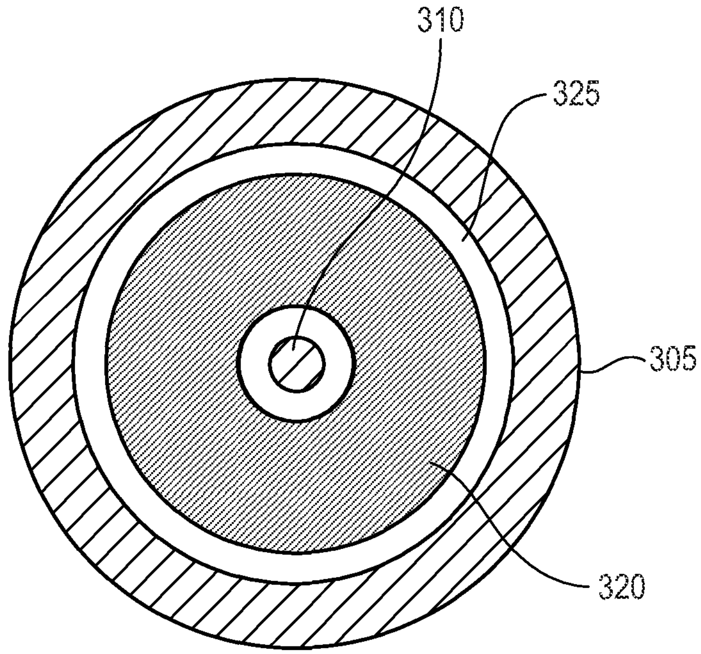
Figure 3C:
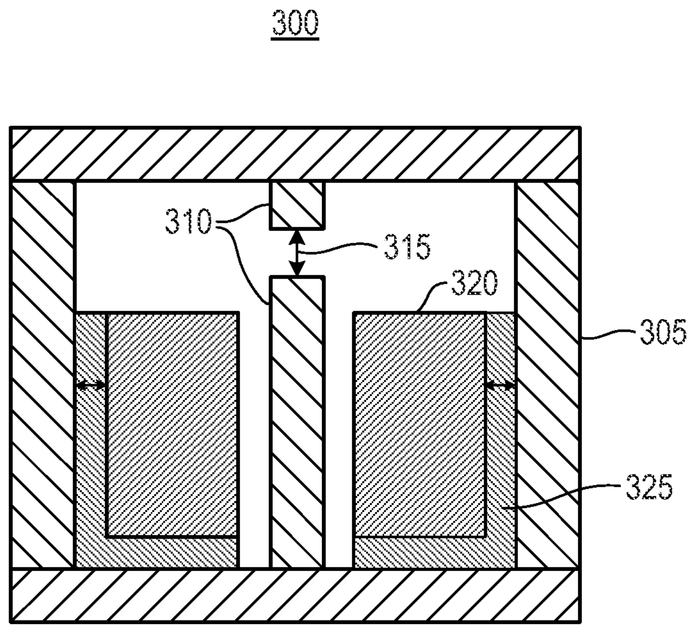

FIGS. 3A through 3C are diagrams of an electromagnet structure 300 configured to incorporate a YIG filter in accordance with a representative embodiment. In particular, FIG. 3A is a cross-sectional side view of electromagnet structure 300, FIG. 3B is a cross-sectional top view of electromagnet structure 300, and FIG. 3C is a cross-sectional side view of a modified version of electromagnet structure 300.

Referring to FIG. 3A, electromagnet structure 300 comprises a shell 305, a magnetic pole 310, and a conductive coil 320.

Conductive coil 320 comprises several loops of a conductive material such as copper. These loops are wound around magnetic pole 310 in the form of a solenoid, as shown, for instance in FIG. 3B. Conductive coil 320 receives a variable current and produces a magnetic field proportional to the current. This induces a magnetic field in magnetic pole 310, and the magnetic field is driven across a pole gap 315 between upper and lower portions of magnetic pole 310. The magnetic field then circulates around the outside walls of shell 305 and returns up the lower portion of magnetic pole 310.

Shell 305 and magnetic pole 310 are typically fabricated from a magnetic alloy, such as 50% nickel and 50% iron. Shell 305 and magnetic pole 310 can be made from the same blank or from separate blanks. If made from separate blanks, they can be made from different alloys and can be joined by screw attachment, by welding, or other means. Together, shell 305 and magnetic pole 310 form a self-shielding structure for containing magnetic fields.

Pole gap 315 is used to focus the magnetic field on a YIG filter such as that illustrated in FIG. 1. In general, the passband of the YIG filter is a function of the magnetic flux density in pole gap 315. Accordingly, the YIG filter can be tuned to a desired passband by varying the strength of the magnetic field in pole gap 315, or varying the size of pole gap 315. In most applications, the magnetic flux density of pole gap 315 is controlled by modifying the strength of the magnetic field using a variable current. However, the magnetic flux density can be inadvertently modified by thermal expansion of pole gap 315, leading to frequency drift of the YIG filter.

In a modified embodiment shown in FIG. 3C, conductive coil 320 is attached to shell 305 by forming an adhesive (e.g., epoxy) layer 325 between outer portions of conductive coil 320 and inner portions of shell 305. In some embodiments, adhesive layer 325 is further formed between conductive coil 320 and magnetic pole 310.

In alternative embodiments, conductive coil 320 can be modified by forming multiple coils around the lower portion of magnetic pole 310, or by forming one or more coils around each of the upper and lower portions of magnetic pole 310. In addition, pole gap 315 can be modified by placing it at a lower position within shell 305. These and other configurations of conductive coil 320 and magnetic pole 310 can be used in conjunction with a heater or coil pedestal such as those illustrated in FIGS. 5 through 8, and 12 through 13.

Figure 4A:
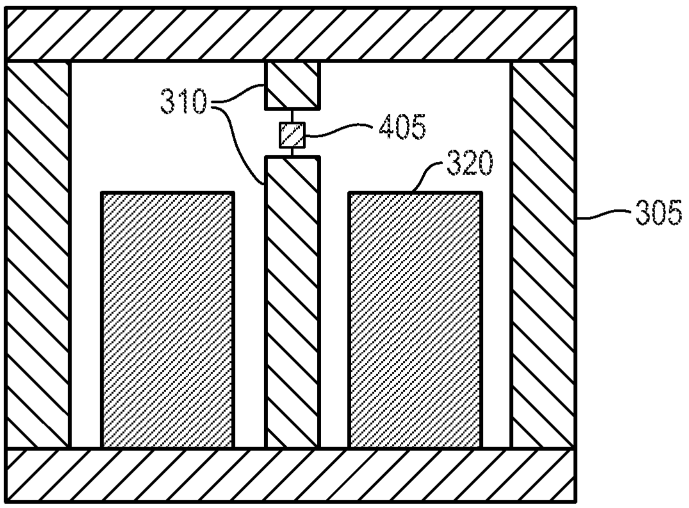
FIGS. 4A and 4B are cross-sectional diagrams of the electromagnet structure of FIG. 3 with an inserted YIG filter in accordance with a representative embodiment.
Figure 4B:
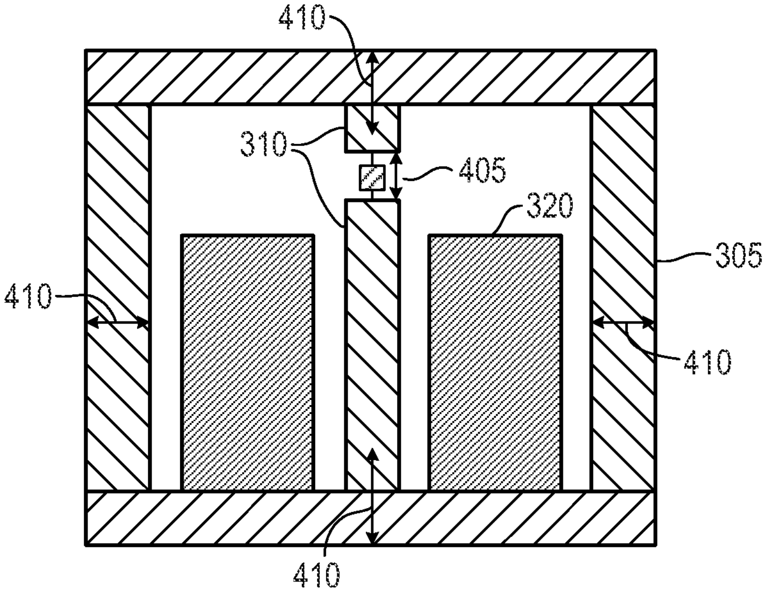

FIGS. 4A and 4B are diagrams of electromagnet structure 300 of FIG. 3A with an inserted YIG filter 405 in accordance with a representative embodiment.

As illustrated in FIG. 4A, YIG filter 405 is placed within pole gap 315 along an axis of magnetic pole 310. In some embodiments, YIG filter 405 can take the form of a YIG sphere and coils such as those illustrated in FIG. 1.

During operation of YIG filter 405, an electrical current is applied to conductive coil 320 to create a magnetic field in magnetic pole 310. The magnetic field is driven across pole gap 315 to control the passband of YIG filter 405. More specifically, the passband is controlled by varying the intensity of the magnetic field applied to YIG filter 405. This is generally accomplished by varying the electrical current applied to conductive coil 320.

As illustrated in FIG. 4B, thermal expansion 410 can occur at various locations in electromagnet structure 300 due to heat generated by conductive coil 320. The amount of heat varies according to the magnitude of current supplied to conductive coil 320, and the magnitude of the current is generally increased to tune YIG filter 405 to higher frequencies. More specifically, the amount of heat varies according to the total power applied to conductive coil 320, which is proportional to the square of the magnitude of the current.

A significant amount of thermal expansion can occur if the current is increased by a large amount, for example, to tune the YIG filter from a lowest frequency to a highest frequency. Moreover, this thermal expansion can cause significant frequency drift in the YIG filter. As an example, in the spectrum analyzer front-end shown in FIG. 2, a large current increase is required to tune preselector 220 from a lowest frequency of 3.1 GHz to a highest frequency of 50 GHz. In particular, the current must increase by a factor of about 14 times, which increases the amount of dissipated heat by more than 200 times. This dramatic increase in heat dissipation leads to significant thermal expansion of electromagnet structure 300, producing an unacceptable level of frequency drift after the tuning of the preselector.

Thermal expansion can also occur due to changes in ambient temperature, such as the temperature of a room in which electromagnet structure 300 is located. Changes in ambient temperature tend to occur more slowly than changes in the temperature conductive coil 320. Nevertheless, it can be beneficial to compensate for the effects of those changes.

As YIG filter 405 is operated at higher frequencies, it becomes more sensitive to thermal expansion of electromagnet structure 300. In other words, at higher frequencies, the same amount of thermal expansion in electromagnet structure 300 causes a greater amount of frequency drift in YIG filter 405. This increased sensitivity occurs at higher frequencies because a stronger magnetic field exists in pole gap 315. In the presence of a stronger magnetic field, expansion or contraction of pole gap 315 causes a proportionally larger change in the magnetic flux density applied to YIG filter 405. For example, the same change in pole gap 315 will result in almost twice the frequency drift at 50 GHz than at 26.5 GHz because the magnetic flux density is almost twice as high, as illustrated by the equation $B_{50GHz}/B_{26.5GHz}$=50 GHz/26.5 GHz=1.89.

Figure 5:
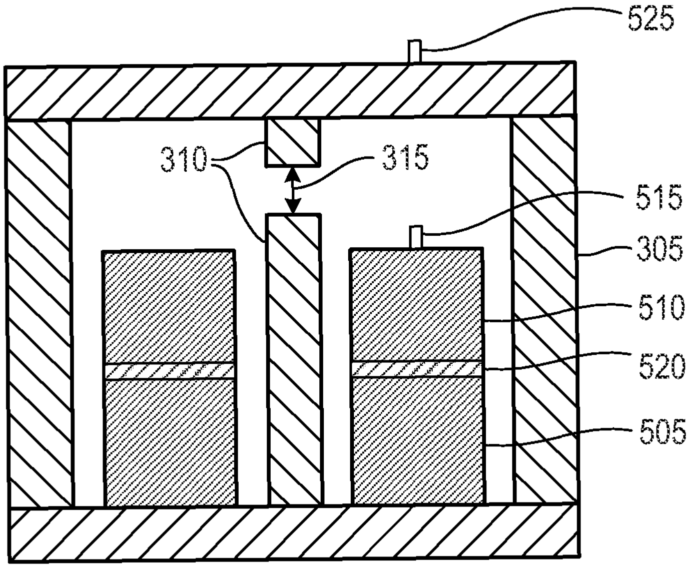
FIGS. 5 through 8 are cross-sectional diagrams of various electromagnet structures incorporating an embedded heater in accordance with representative embodiments.

FIG. 5 is a diagram of an electromagnet structure 500 incorporating an embedded heater in accordance with a representative embodiment. The heater is used to maintain electromagnet structure 500 at a substantially constant temperature even when the amount of current in a conductive coil is changed.

Referring to FIG. 5, electromagnet structure 500 is similar to electromagnet structure 300 of FIGS. 3 and 4, except that conductive coil 320 is replaced by a lower conductive coil 505 an upper conductive coil 510. In addition, electromagnet structure 500 further comprises a heater 520 located between lower and upper conductive coils 505 and 510, a temperature sensor 515 located on upper conductive coil 510, and a temperature sensor 525 located external to shell 305 and configured to monitor the ambient temperature.

Heater 520 is attached between lower and upper conductive coils 505 and 510 by an adhesive such as epoxy. In some embodiments, heater 520 is formed on a flex circuit having resistive elements. The flex circuit can be placed on top of lower conductive coil 505, and then upper conductive coil 510 can be placed on top of the flex circuit. The flex circuit can be controlled through an electrical connection passing through a slot in shell 305.

Heater 520 maintains electromagnet structure 500 at a substantially constant temperature by modifying the amount of heat that it generates based on the amount of heat generated by lower and upper conductive coils 505 and 510. For example, heater 520 may generate less heat when lower and upper conductive coils 505 and 510 generate more heat, and it may generate more heat when lower and upper conductive coils 505 and 510 generate less heat. In this manner, the combined heat generated by lower and upper conductive coils 505 and 510 and heater 520 remains substantially constant.

One way to control the amount of heat generated by heater 520 is to use temperature sensor 515 to detect the temperature of lower and upper conductive coils 505 and 510, and to adjust the amount of electrical power supplied to heater 520 according to the detected temperature. In the embodiment of FIG. 5, temperature sensor 515 takes the form of an independent element such as a thermocouple or a thermistor. In other embodiments, temperature sensor 515 can be implemented by an element that detects a resistance change of lower or upper conductive coils 505 or 510. The position of temperature sensor 515 can be modified to measure different internal temperatures of electromagnet structure 500 such as the temperature at a tip of magnetic pole 310 or different portions of lower and upper conductive coils 505 and 510.

Another way to control the amount of heat generated by heater 520 is to ensure that the sum of the electrical power supplied to heater 520 and lower and upper conductive coils 505 and 510 remains substantially constant. For instance, where less power is supplied to lower and upper conductive coils 505 and 510, more power can be supplied to heater 520, and vice versa.

Still another way to control the amount of heat generated by heater 520 is to monitor the ambient temperature of electromagnet structure 500 using temperature sensor 525. Heater 520 can be controlled to generate more heat as the ambient temperature drops, or less heat as the ambient temperature rises.

Heater 520 can take various forms, such as discrete resistor elements or a distributed resistor network. In the distributed resistor network, heater 520 is formed from a resistive foil. Where the network comprises at least two resistors, the resistors can be arranged such that current flows in opposite directions around magnetic pole 310 in order to minimize unwanted magnetic fields.

Heater 520 can also be implemented by an independent magnetic coil coupled to magnetic pole 310. In other words, heater 520 can be one of two independent magnetic coils used to tune a YIG filter. The two magnetic coils can be controlled independently such that the net magnetic field applied to magnetic pole 310 is varied linearly and the heat generated by the two coils is substantially constant. The use of these two magnetic coils can eliminate the need to include separate resistive elements in electromagnet structure 500. However, requires two clean current sources and a control algorithm to achieve linear tuning current and constant power.

Heater 520 can be energized in various ways, such as applying a linearly modulated current source or by pulse-width modulated signal. The pulse-width modulated signal can be filtered and/or dithered to minimize unwanted magnetic fields in magnetic pole 310.

Figure 6:
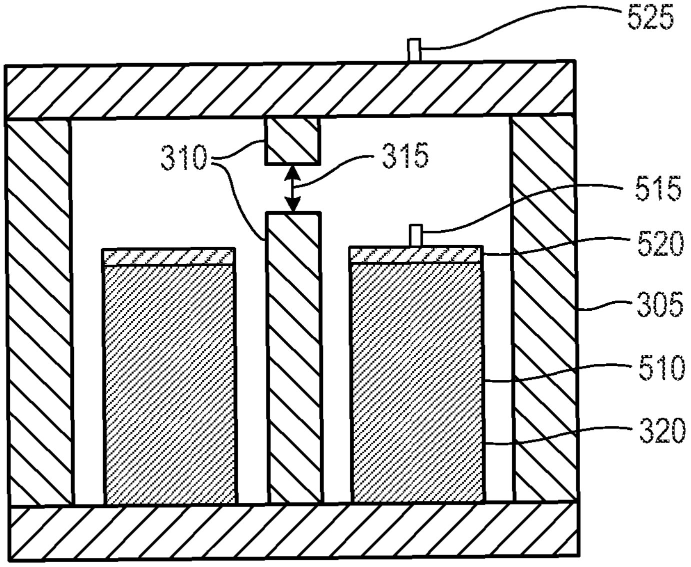
Figure 7:
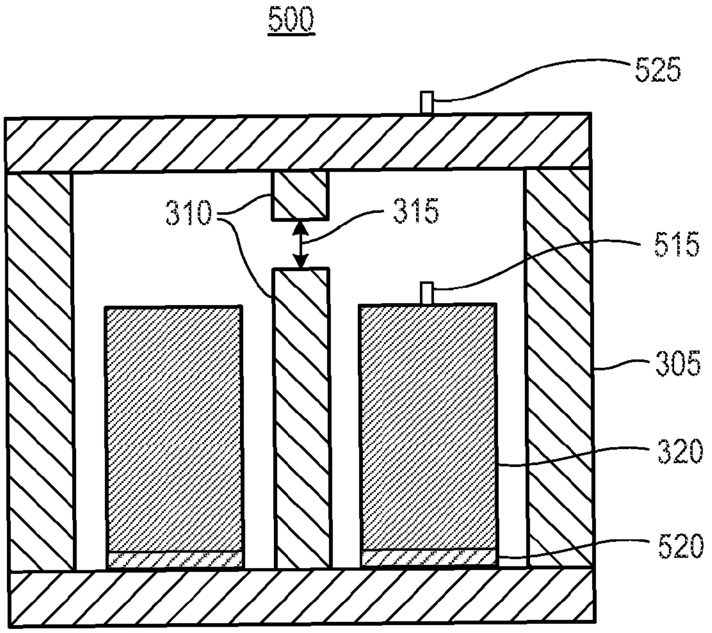
Figure 8:
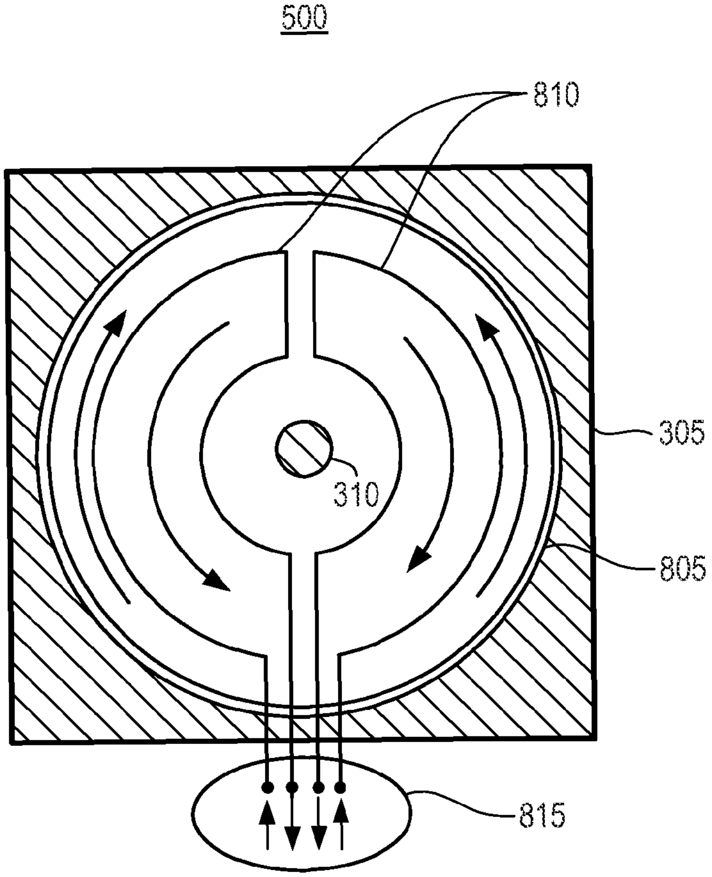

FIGS. 6 through 8 are cross-sectional diagrams illustrating various alternative configurations of electromagnet structure 500 of FIG. 5. These alternative configurations share many common features with electromagnet structure 500 of FIG. 5, and the following description will focus on the features that differ.

FIG. 6 shows a variation of electromagnet structure 500 in which lower and upper conductive coils 505 and 510 are replaced by conductive coil 320 of FIG. 3, and heater 520 is placed on top of conductive coil 320.

FIG. 7 shows another variation of electromagnet structure 500 in which lower and upper conductive coils 505 and 510 are replaced by conductive coil 320 of FIG. 3, and heater 520 is placed below conductive coil 320.

FIG. 8 shows a variation of electromagnet structure 500 in which heater 520 is formed by a parallel resistor network 810 in a resistive foil 805. Parallel resistor network 810 comprises two independent resistive elements that receive electrical currents 815 in opposite directions around magnetic pole 310. These electrical currents create a counter current flow to minimize the net magnetic field generated in magnetic pole 310 by parallel resistor network 810.

Figure 9:
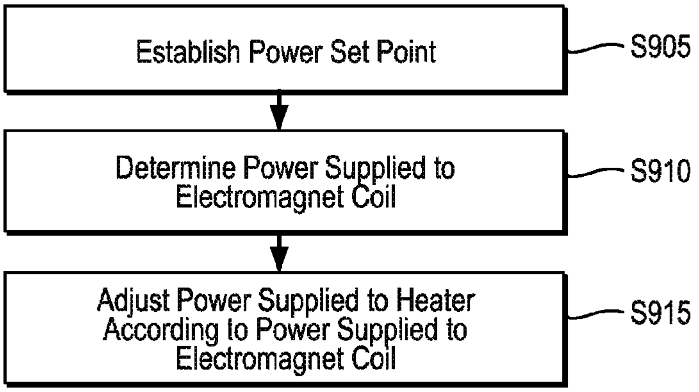
FIGS. 9 through 11 are flowcharts illustrating various methods of controlling the temperature of an electromagnet structure in accordance with representative embodiments.
Figure 10:
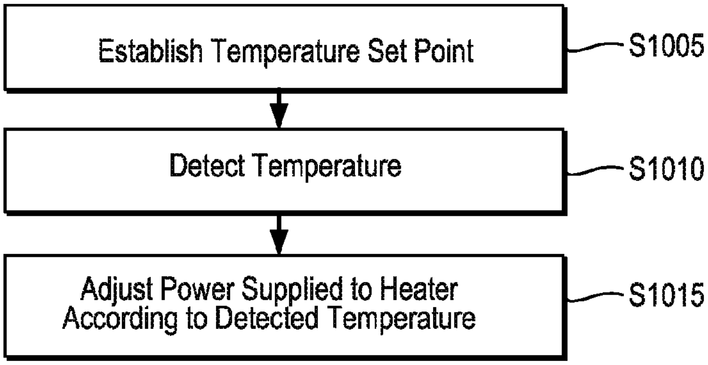
Figure 11:
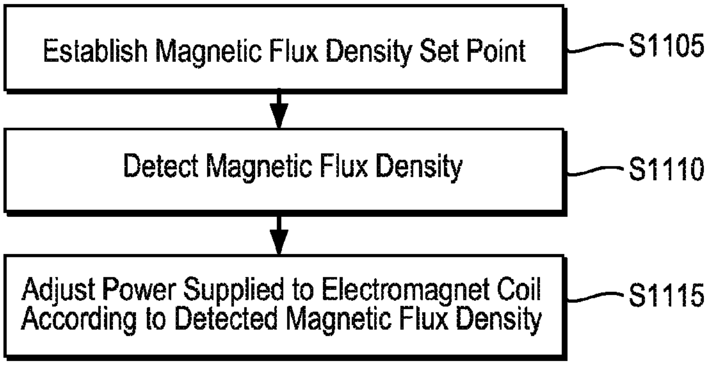

FIGS. 9 through 11 illustrate three different methods that can be used to prevent frequency drift of a filter in an electromagnet structure such as those illustrated in FIGS. 3 through 8. In each of these methods, a set point is established for a specific parameter of the electromagnet structure. The parameter is monitored, and an input signal is adjusted to maintain the parameter at the set point. This prevents the filter from drifting from a target frequency range.

In the method of FIG. 9, the monitored parameter is the combined power consumption of a heater and an electromagnet coil in an electromagnet structure. The combined power consumption is maintained at a set point by increasing the power applied to the heater in response to a decrease in the power applied to the electromagnet coil, and decreasing the power applied to the heater in response to an increase in the power applied to the electromagnet coil.

In the method of FIG. 10, the monitored parameter is the temperature of an electromagnet coil. The temperature is maintained at a set point by increasing the amount of power supplied to a heater in response to a decrease in detected temperature, and decreasing the amount of power supplied to a heater in response to an increase in detected temperature.

In the method of FIG. 11, the monitored parameter is magnetic flux density within a pole gap of an electromagnet structure. The magnetic flux density is maintained at a set point by adjusting the amount of power supplied to an electromagnet coil to compensate for changes in the size of the pole gap due to thermal expansion.

For convenience of explanation, the methods of FIGS. 9 through 11 are described with reference to the electromagnet structures of FIGS. 3 through 8. However, these methods are not limited to these structures. In addition, in the description that follows, example method steps are indicated by parentheses (SXXX).

Referring to FIG. 9, a first method establishes a set point for the power to be supplied to conductive coil 320 and heater 520 (S905). The set point represents a target value for the sum of the power to be supplied to conductive coil 320 and the power to be supplied to heater 520. The set point can be determined, for instance, by the amount of power supplied to conductive coil 320 when tuning YIG filter 405 to a highest frequency range. Accordingly, where YIG filter 405 is tuned to a highest frequency range (e.g., 50 GHz), zero power can be supplied to heater 520, as YIG filter 405 is tuned to lower frequency ranges, a greater amount of power can be supplied to heater 520.

Next, the method determines or identifies an amount of power supplied to conductive coil 320 to tune filter 405 (S910). This can be performed in various ways, such as measuring an amount of current in conductive coil 320, measuring a voltage across conductive coil 320, or measuring a resistance value of conductive coil 320.

Finally, the method adjusts an amount of power supplied to heater 520 according to the amount of power supplied to conductive coil 320 (S915). Where a greater amount of power is supplied to conductive coil 320, a smaller amount of power is supplied to heater 520, and vice versa.

Referring to FIG. 10, a second method establishes a set point for a temperature of conductive coil 320 or another part of electromagnet structure 500 (1005). This set point can be determined, for example, by experimentally bringing electromagnet structure 500 to thermal equilibrium when YIG filter 405 is tuned to a maximum frequency range, and using the corresponding temperature as the set point. In general, the set point temperature will be valid for a given ambient temperature condition. Accordingly, it may be beneficial to adjust the set point using for different values of ambient temperature as detected by temperature sensor 525.

Next, the method detects a temperature of a portion of electromagnet structure 500 (S1010). As illustrated, for example, by FIGS. 6 through 8, the temperature can be detected at a top portion of conductive coil 320. It can also be detected at other portions of electromagnet structure 500. The temperature can be detected by various types of devices, such as a thermocouple, a thermistor, or an element that detects a resistance change of conductive coil 320.

Finally, the method adjusts the amount of power supplied to heater 520 according to the detected temperature (S1015). Where the detected temperature is below the set point, the method increases the amount of power supplied to heater 520, and where the detected temperature is above the set point, the method decreases the amount of power supplied to heater 520.

Referring to FIG. 11, a third method establishes a set point of the magnetic flux density of pole gap 315 (S1105). As discussed above, the magnetic flux density of pole gap 315 determines the tuning frequency of YIG filter 405. It can vary according to the size of pole gap 315 and the strength of the magnetic field in pole gap 315. Accordingly, one way to maintain the magnetic flux density at a substantially constant level is to increase or decrease the strength of the magnetic field in response to thermal expansion of pole gap 315. For example, where pole gap 315 is increased, the strength of the magnetic field can be increased accordingly.

Next, the method monitors the magnetic flux density in pole gap 315 (S1110). This can be accomplished, for example, by using feedback regarding the center frequency of YIG filter 405. For instance, a decrease in magnetic flux density can be inferred from a decrease in the center frequency of YIG filter 405.

Finally, the method adjusts the amount of power supplied to conductive coil 320 according to a detected change in magnetic flux density (S1115). This adjustment of the coil power can stabilize the passband of YIG filter 405 without requiring heater 520 in electromagnet structure 500.

Figure 12A:
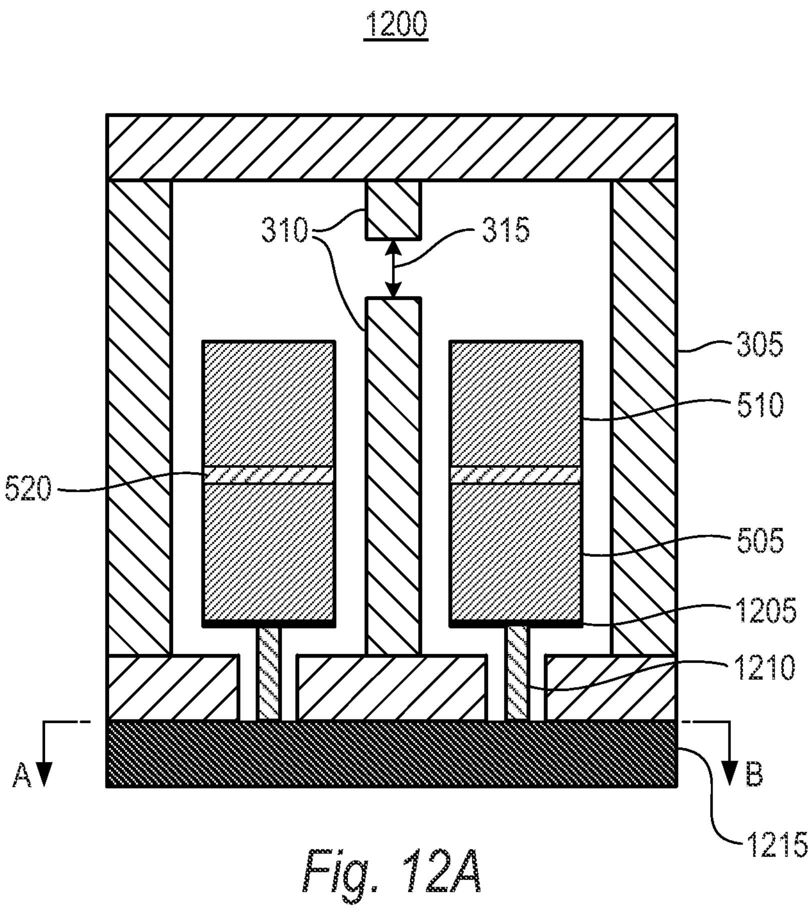
FIGS. 12A and 12B are a cross-sectional diagrams of an electromagnetic structure incorporating a coil isolation pedestal in accordance with a representative embodiment.
Figure 12B:
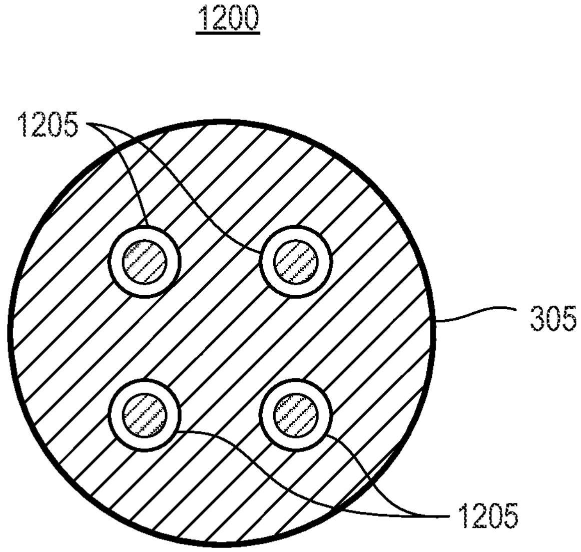

FIGS. 12A and 12B are cross-sectional diagrams of an electromagnetic structure 1200 incorporating a coil isolation pedestal in accordance with a representative embodiment. In particular, FIG. 12A is a cross-sectional side view of electromagnet structure 1200 and FIG. 12B is a cross-sectional top view of electromagnet structure 1200, taken along a line A-B in FIG. 12A.

Referring to FIGS. 12A and 12B, electromagnet structure 1200 is similar to electromagnet structure 300 of FIG. 3, except that lower and upper conductive coils 505 and 510 are mounted on a coil isolation pedestal 1205. Coil isolation pedestal 1205 is connected to a heat spreader 1215 via pedestal legs 1210, which pass through holes in a bottom portion of shell 305 between coil isolation pedestal 1205 and heat spreader 1215. These holes have a relatively minor influence on the magnetic properties of shell 305 because they pass through a region of low magnetic flux density.

Coil isolation pedestal 1205 separates lower and upper conductive coils 505 and 510 and its temperature effects from shell 305. In particular, it conducts heat away from lower and upper conductive coils 505 and 510 to heat spreader so that shell 305 is less sensitive to changes in the power applied to lower and upper conductive coils 505 and 510. In addition, it mechanically separates conductive coil 320 from shell 305 so that mechanical variations in conductive coil 320, such as those from thermal expansion, do not distort the shape of shell 305.

Heat spreader 1215 is typically made from an engineering alloy with a higher thermal conductivity than shell 305. For example, heat spreader 1215 can be made from aluminum. In addition, heat spreader 1215 is generally larger than shell 305 and it can be attached to a chassis. This configuration tends to reduce stresses imposed on electromagnet structure 1200. Moreover, because heat spreader 1215 has a larger plan area and is made from a higher thermally conducting alloy than the magnet shell, it spreads heat generated by conductive coil 320 to the instrument chassis.

Heat spreader 1215 and coil isolation pedestal 1205 can also reduce radial strain on shell 305 due to the expansion of conductive coil 320. Radial strain tends to occur in electromagnet structure 300 of FIG. 3C because the thermal expansion coefficient of conductive coil 320 is generally different from the thermal expansion coefficient of shell 305, and because adhesive layer 325 is incompressible. Consequently, as the temperature of expansion of conductive coil 320 varies, it can impose radial strain on shell 305 as illustrated, for example, by lateral arrows in FIG. 3C.

Because shell 305 typically has a thin walled shape, the radial strain can cause axial bowing at the ends of shell 305. Moreover, because magnetic pole 310 is attached to the ends of shell 305, the axial bowing can change the size of pole gap 315, resulting in frequency drift. The radial strain can be reduced by omitting an adhesive layer such as that illustrated in FIG. 3C, so there is a gap between conductive coil 320 and shell 305. It can also be reduced by placing conductive coil 320 on coil isolation pedestal 1205.

Coil isolation pedestal 1205 and pedestal legs 1210 can be fabricated from an engineering alloy such as aluminum, brass, or copper. The engineering alloy can be selected to have a thermal expansion match to conductive coil 320, allowing coil isolation pedestal 1205 to be connected to conductive coil 320 by a relatively thin layer of adhesive. This can reduce the effects of thermal resistance of the adhesive. In addition, the engineering alloy can have significantly higher thermal conductivity than shell 305. For example, aluminum alloy 6061 has approximately 13 times higher thermal conductivity than a 50% Ni 50% Fe magnetic alloy. The higher thermal conductivity of coil isolation pedestal 1205 can maintain conductive coil 320 at a cooler temperature, which can prevent pole gap 315 from changing.

In certain alternative embodiments, coil isolation pedestal 1205 is mounted directly to shell 305, and shell 305 is mounted directly to heat spreader 1215. In such embodiments, through holes can be formed in shell 305 to connect pedestal legs 1210 to coil isolation pedestal 1205. In these embodiments, if heat spreader 1215 is made from a material with a significantly different thermal coefficient from shell 305, the combination of materials can create a bi-metal device that produces a change in pole gap 315. Accordingly, heat spreader 1215 is typically formed of a material with a similar coefficient of thermal expansion to shell 305.

Because coil isolation pedestal 1205 is located in a magnetic field formed by conductive coil 320, eddy currents can form in coil isolation pedestal 1205 in response to changes in the magnetic field of conductive coil 320. These eddy currents can slow the sweep speed of a filter within electromagnet structure 1200 through induced magnetic fields created by the eddy current.

The effects of these eddy currents can be reduced in a number of ways. In one example, these effects are reduced can be reduced by forming coil isolation pedestal 1205 of a zero susceptibility material such as a ceramic. Such a material can be formed by plating a diamagnetic material onto a paramagnetic material. In another example, the effects of eddy currents are reduced by forming coil isolation pedestal 1205 of a thin metallic material, and slotting the material so a continuous loop is not formed around magnetic pole 310. In yet another example, the effects of eddy currents are reduced by forming coil isolation pedestal 1205 of separate pedestal pieces so that an eddy current loop is not formed.

Figure 13:
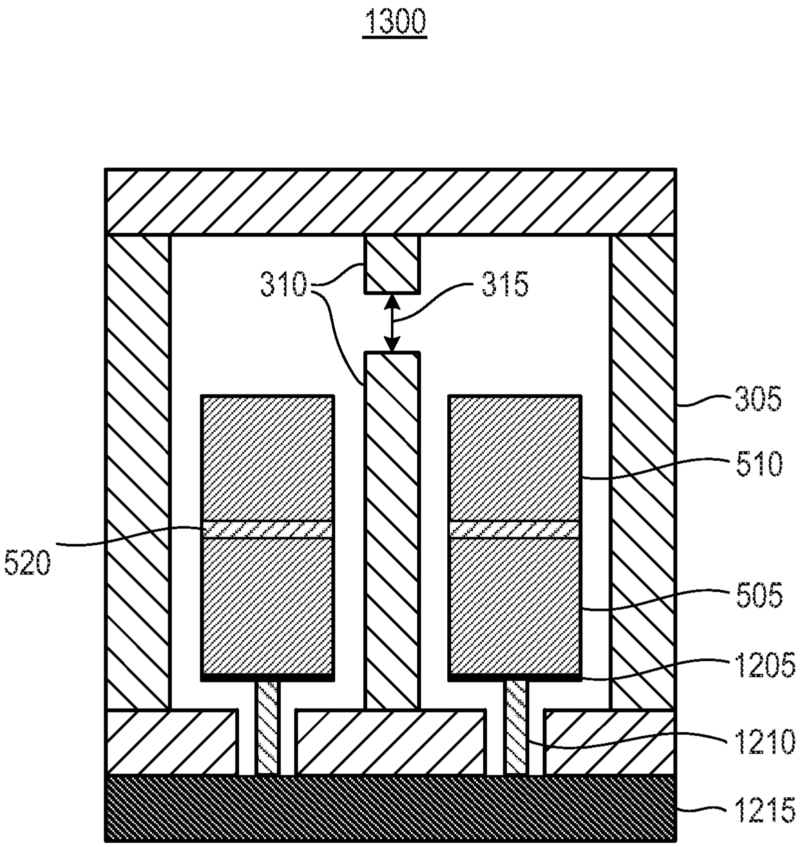
FIG. 13 is a cross-sectional diagram of an electromagnetic structure incorporating an embedded heater and a coil isolation pedestal in accordance with a representative embodiment.

FIG. 13 is a cross-sectional diagram of an electromagnetic structure 1300 incorporating an embedded heater 520 and a coil isolation pedestal 1205 in accordance with a representative embodiment. This embodiment illustrates one of many ways in which the above-described features can be combined to reduce frequency drift in a magnetically tuned filter.

In various alternative embodiments, different coil and heater configurations, such as those described with reference to FIGS. 5 through 8, can be combined with various pedestal configurations, such as those described with reference to FIG. 13. In addition, various control methods can be applied to these and other embodiments, such as the control methods described with reference to FIGS. 9 through 11.

While example embodiments are disclosed herein, one of ordinary skill in the art will appreciate that many variations that are in accordance with the present teachings are possible and remain within the scope of the appended claims. The invention therefore is not to be restricted except within the scope of the appended claims.

What is claimed is:

1. An electromagnet structure, comprising:
a magnetic shell comprising a cavity;
a magnetic pole located within the cavity and having a magnetic gap for focusing
a magnetic field on a magnetically tunable filter;
a conductive coil located within the cavity of the magnetic shell and forming multiple turns around the magnetic pole;
a heater located within the cavity of the magnetic shell and configured to maintain the conductive coil at a substantially constant temperature when the magnetically tunable filter is tuned to different frequencies: and
a pedestal located within the cavity, wherein the conductive coil is mounted on the pedestal.

2. The electromagnet structure of claim 1, further comprising:
a heat spreader formed outside the magnetic shell; and
pedestal legs connected between the pedestal and the heat spreader.

3. The electromagnet structure of claim 2, wherein the pedestal legs pass through holes in the magnetic shell.

4. The electromagnet structure of claim 1, wherein the heater comprises independent resistive elements that receive electrical currents in opposite directions around the magnetic pole.

5. The electromagnet structure of claim 1, wherein the heater is controlled such that a substantially constant amount of power is applied to the heater and the conductive coil.

6. The electromagnet structure of claim 1, further comprising a temperature sensor located within the cavity, wherein the heater is controlled according to a reading of the temperature sensor.

7. The electromagnet structure of claim 6, wherein the temperature sensor comprises a thermistor or a thermocouple.

8. The electromagnet structure of claim 1, further comprising an ambient temperature sensor located outside the cavity, wherein the heater is controlled according to a reading of the ambient temperature sensor.

9. The electromagnet structure of claim 1, further comprising at least one ferrimagnetic resonator located within the magnetic gap.

10. The electromagnet structure of claim 1, further comprising a second conductive coil forming multiple turns around the magnetic pole, wherein the heater is located between the conductive coil and the second conductive coil.

11. The electromagnet structure of claim 1, wherein a gap is formed between the conductive coil and a wall of the magnetic shell.

12. A method of controlling an electromagnet structure comprising an electronic filter, the method comprising:
energizing an electromagnet coil to tune the filter to a target frequency range;
determining a set point of a parameter to maintain the filter in the target frequency range;
receiving feedback indicating a state of the parameter; and
adjusting a power level of an input signal supplied to the electromagnet structure to maintain the parameter at the set point.

13. The method of claim 12, wherein adjusting the power level of the input signal comprises adjusting an amount of power supplied to a heater located inside the electromagnet structure.

14. The method of claim 13, wherein the power level of the input signal is adjusted using pulse-width modulation.

15. The method of claim 12, wherein the parameter is magnetic flux density within a pole gap of the electromagnet structure, and adjusting the power level of the input signal comprises adjusting an amount of power supplied to the electromagnet coil to compensate for a size change of the pole gap.

16. The method of claim 13, wherein the parameter is a total amount of power supplied to the electromagnet structure, and the amount of power supplied to the heater is adjusted to maintain the total amount of power supplied to the electromagnet structure at a substantially constant level.

17. The method of claim 13, wherein the parameter is a temperature of the electromagnet coil, and the amount of power to be supplied to the heater is determined based on the temperature.

18. The method of claim 13, further comprising:
tuning the fitter from a first frequency range to a second frequency range higher than the first frequency range; and
reducing the amount of power supplied to the heater to compensate for an increase in power supplied to the electromagnet coil.

19. The method of claim 12, wherein the parameter is an ambient temperature of the electromagnet structure.

20. An electromagnet structure, comprising:
a magnetic shell comprising a cavity;
a magnetic pole located within the cavity and having a magnetic gap for focusing
a magnetic field on a magnetically tunable filter;
a conductive coil located within the cavity of the magnetic shell and forming multiple turns around the magnetic pole; and
a heater located within the cavity of the magnetic shell and configured to maintain the conductive coil at a substantially constant temperature when the magnetically tunable filter is tuned to different frequencies.

* * * * *

UNITED STATES PATENT AND TRADEMARK OFFICE

CERTIFICATE OF CORRECTION

PATENT NO. : 8,760,236 B2
APPLICATION NO. : 13/193024
DATED : June 24, 2014
INVENTOR(S) : Charles Maker et al.

It is certified that error appears in the above-identified patent and that said Letters Patent is hereby corrected as shown below:

On the Title page, in item (54), in column 1 in "Title", line 4, and in the Specification, column 1, line 4, delete "ELCTROMAGNET" and insert -- ELECTROMAGNET --, therefor.

In the Claims:

In column 11, line 38, in claim 1, delete "frequencies:" and insert -- frequencies; --, therefor.

In column 12, line 45, in claim 18, delete "fitter" and insert -- filter --, therefor.

Signed and Sealed this
Ninth Day of September, 2014

Michelle K. Lee
*Deputy Director of the United States Patent and Trademark Office*